Aug. 21, 1956 A. VAN WEEL 2,760,002

TIME-MULTIPLEX PULSE MODULATION COMMUNICATION SYSTEM

Filed Oct. 14, 1950 3 Sheets-Sheet 1

INVENTOR.
ADELBERT VAN WEEL
BY Fred M Vogel
AGENT

INVENTOR.
ADELBERT VAN WEEL
BY [signature]
AGENT

Aug. 21, 1956 A. VAN WEEL 2,760,002

TIME-MULTIPLEX PULSE MODULATION COMMUNICATION SYSTEM

Filed Oct. 14, 1950 3 Sheets-Sheet 3

INVENTOR.
ADELBERT VAN WEEL
BY [signature]
AGENT

United States Patent Office 2,760,002

Patented Aug. 21, 1956

2,760,002

TIME-MULTIPLEX PULSE MODULATION COMMUNICATION SYSTEM

Adelbert Van Weel, Eindhoven, Netherlands, assignor to Hartford National Bank and Trust Company, Hartford, Conn., as trustee Application October 14, 1950, Serial No. 190,068

Claims priority, application Netherlands October 17, 1949

11 Claims. (Cl. 179—15)

Figure 1A:
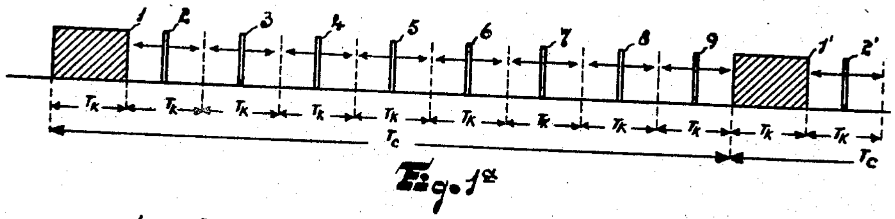

This invention relates to methods of transmitting a plurality of signals by pulse modulation through transmission channels operating in time-multiplex, a number of signal pulses corresponding to the number of channels being transmitted during each transmission cycle, and to transmitting and receiving devices for use therewith. Such multiplex systems are used inter alia for multiplex transmission of telephone, telegraph or other signals.

In known multiplex systems the transmission channels are successively rendered operative for a brief interval during each system cycle by means of respective pulses in the series of channel-gate pulses coinciding with a cycle period. As a rule, the signals are transmitted by pulse-phase modulation, in which event the phase sweep of a signal pulse with respect to its unmodulated position, which preferably coincides with the center of the corresponding gate pulse, characterises the instantaneous value of the signal to be transmitted. This type of transmission is ordinarily designated time-multiplex with pulse-phase modulation. The series of gate pulses in such multiplex systems are used at both the transmitting and receiving ends, and the gate-pulse circuits used for this purpose must be synchronized accurately for satisfactory operation.

In other known multiplex systems the use of such gate-pulse circuits may be avoided. Here use is made of a multiplex transmitting device in which each transmission channel includes a pulse modulator serving as pulse generator, the pulse generators exciting one another in succession for generating signal pulses associated with the channel involved after a certain period dependent on the signal to be transmitted. The variations in time interval between signal pulses associated with succeeding channels then characterise only the signal to be transmitted in the latter of the channels, the mean time-constant between these pulses being determined by the mean-time-constant of the pulse generator included in the last-mentioned channel. This type of transmission is ordinarily designated as time-multiplex with pulse-interval modulation.

In order to recover the transmitted signals at the receiving end, each receiving channel includes a pulse demodulator for converting the variations in time interval between signal pulses associated with the receiving channel involved and the preceding channel in the signal transmitted in the channel involved. This may be realised, for example, by including a pulse generator serving as a pulse demodulator in each receiving channel, said pulse generators exciting one another in succession and being made inoperative by the signal pulses associated with the channels involved. Pulses modulating in time thus occur across the output circuits of succeeding pulse generators, the variations in time characterising the signals transmitted in the channels involved.

The object of the invention is to provide improvements in multiplex systems of the type last-described.

According to the invention, this object is realised in a system wherein at the instant a transmission channel is made busy, the mean time interval between the signal pulse associated with the transmission channel concerned and the preceding channel is increased.

As will be explained more fully hereinafter, a considerable extension of the number of channels with respect to known systems is thus made possible under otherwise unvaried conditions, while the signalling means may be made particularly simple.

In this connection it is mentioned that in a time-multiplex system with pulse-phase modulation it is known per se for signalling to shift the signal pulses in the channel involved with respect to the unmodulated position through a constant time-interval. However, an increase of the number of channels is thus not rendered possible.

According to a further aspect of the invention, the said increase of the mean time interval, when a transmission channel is made busy at the transmitting end, is ensured by the use of means for increasing the mean time-constant of the pulse generator which serves as a pulse modulator in the channel involved.

The means for increasing the mean time-constant of the pulse generator associated with the channel involved preferably comprises a relay device which is connected therewith and which responds when the said channel is made busy.

The increase of the mean time-constant of the pulse generator may be ensured in such manner that, when the relay device responds, a direct voltage is produced and supplied as a modulating voltage to the pulse generator. As an alternative, when the relay device responds, a switch included in the feed-back circuit of the pulse generator may be actuated.

In order to actuate the relay device when a channel is made busy, the input circuit of the relay device is connected to the signalling means provided in the channel concerned.

To actuate the signalling means at the receiving end, pulse demodulators included in succeeding channels are connected to signalling voltage generators which respond to an increase in the mean time-interval of signal pulses associated with the channel concerned and the preceding channel.

Figure 2:
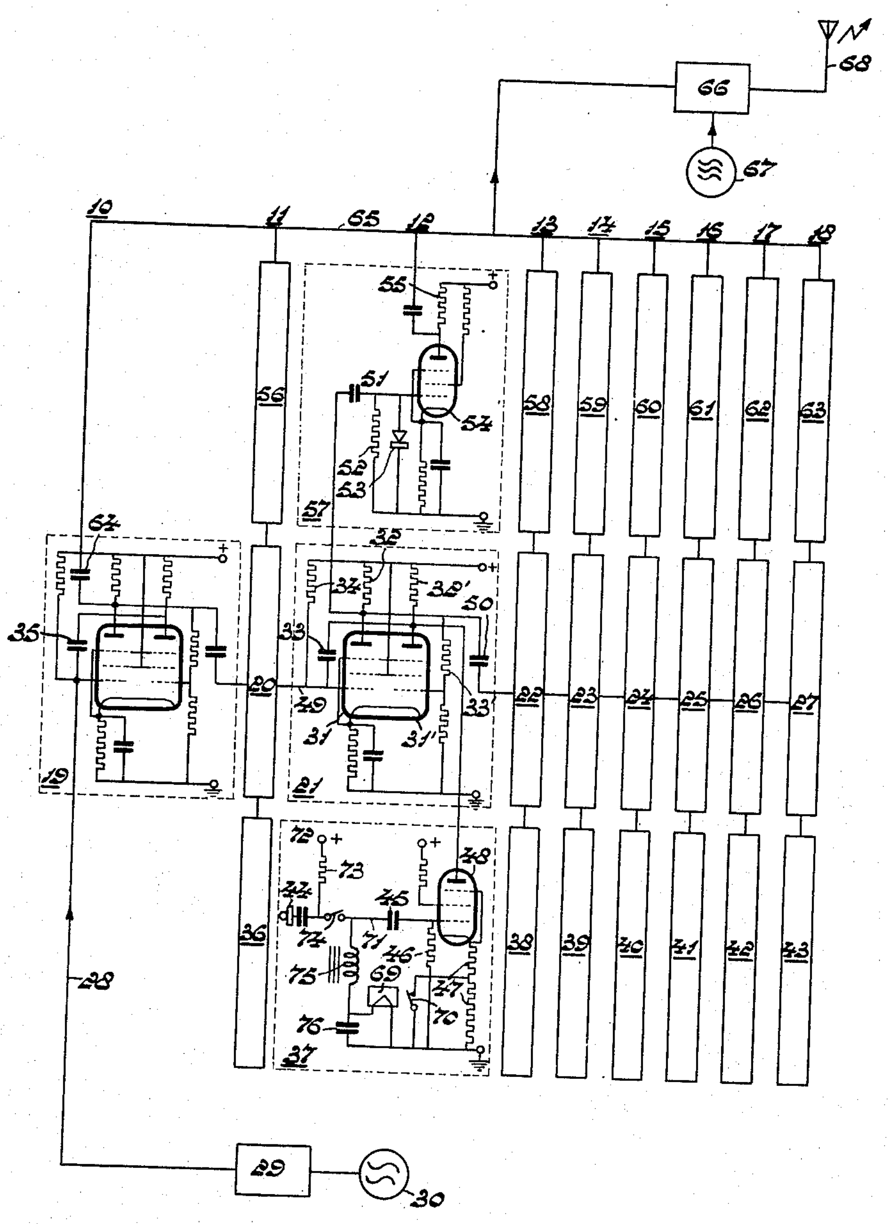
Figure 3:
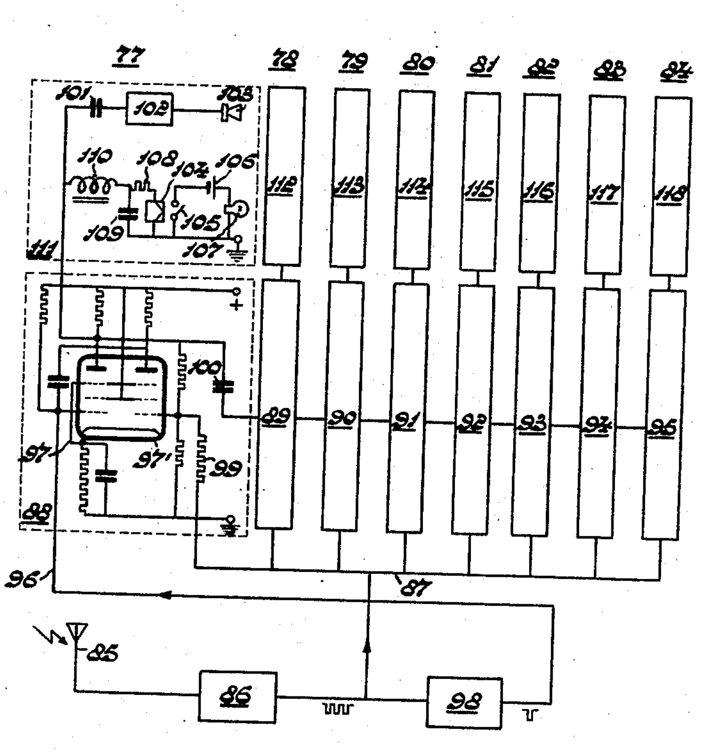

The invention and its advantages will now be explained more fully with reference to the accompanying drawings, in which:

Fig. *1a* is a time diagram for a known time-multiplex system with pulse-phase modulation, Figs. *1b* and *1c* are time diagrams for a known time-multiplex system with pulse-interval modulation, Figs. *1d* and *1e* are time diagrams for a time-multiplex system according to the invention, Fig. 2 shows a multiplex transmitter according to the invention, adapted for carrying out the method of transmission illustrated in Figs. *1d* and *1e*, and Fig. 3 shows a multiplex receiver according to the invention.

In Fig. 1, series of pulses transmitted in different time-multiplex systems are indicated in time diagrams, each for a duration corresponding to one cycle period $T_c$ and a fraction of the succeeding cycle. Fig. *1a* shows a time diagram for a known time-mutiplex system with pulse-phase modulation, Figs. *1b* and *1c* show time diagrams for a known time-multiplex system with pulse-interval modulation, and Figs. *1d* and *1e* show time diagrams for a time-multiplex system according to the invention.

In all these time diagrams use is made of multiplex systems comprising 9 channels, one of which serves for the transmission of synchronisation pulses indicated by cross-hatching. One cycle period is chosen to be 99 microseconds, the duration of the synchronisation pulses and the signal pulses being 11 microseconds and 0.5 microsecond respectively.

The methods of transmission will now be explained more fully by reference to the time diagrams.

Fig. 1*a* shows the time diagram of a series of pulses to be transmitted for a time-multiplex system with pulse-phase modulation in the absence of signals to be transmitted. In such multiplex systems the channels in each system cycle are successively operative for a short time once during equal channel periods. Each cycle period is subdivided into nine equal channel periods $T_k$ (11 microseconds) bounded by dotted lines of which the first comprises the synchronisation pulses 1, 1'. In the other eight channel periods occur signal pulses 2, 3 . . . 9 which in the unmodulated position of the signal pulses shown in Fig. 1*a* coincide with the center of the corresponding channel periods.

When transmission channels are busy, the signal pulses are shifted with respect to the unmodulated position, the value and polarity of the shift characterising the instantaneous value of the signal to be transmitted. The modulation space of the signal pulses indicated by arrows is then at the most equal to the duration of a channel period less the duration of a signal pulse and is 10.5 microseconds in the example shown.

Figure 1B:
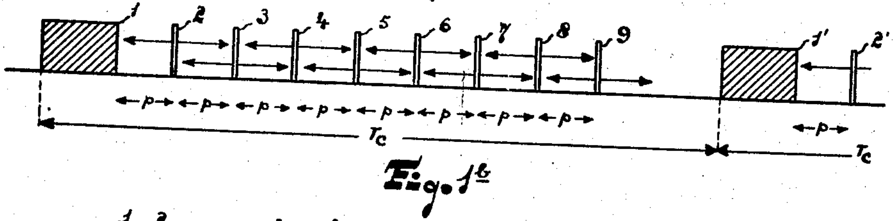

Fig. 1*b* shows the time diagram for a known time-multiplex system with pulse-interval modulation in the absence of signals to be transmitted. During each transmission cycle a number of pulses 1, 2, 3, . . . 9 corresponding to the number of channels are transmitted of which the first is constituted by a synchronisation pulse 1 (1'). The pulses 1, 2, 3, . . . 9 occur in succession at equal time intervals ($p$), while the time interval between the last signal pulse 9 transmitted in a transmission cycle and the subsequent synchronisation pulse 1' must have a higher value for reasons which will be discussed in detail hereinafter.

The modulation space available for each channel is indicated by arrows and substantially equals twice the mean time-interval $p$ between the pulses, so that the maximum shift in time of a signal pulse substantially equals the said mean time-interval ($p$).

Figure 1C:
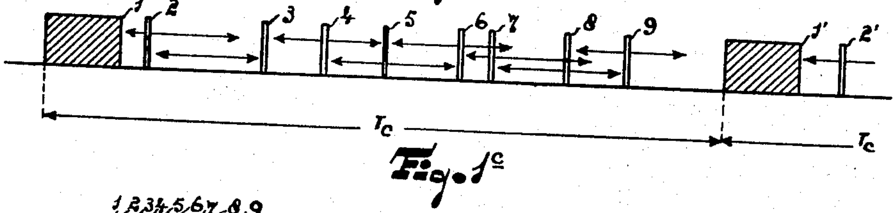

Fig. 1*c* shows the time character of the signal pulses if the channels 2, 3, 6, 7 and 8 are busy, the time intervals between the pulses 1—2, 2—3, 5—6, 6—7 and 7—8 characterising the instantaneous values of the signals occurring in the channels 2, 3, 6, 7 and 8. The time interval between the signal pulses 4, 5 and 9 associated with the clear channels and those associated with the preceding channels has remained unvaried and are as shown in Fig. 1*b*. It is assumed that the instantaneous values of the signals in the channels 2 and 7 are negative and those of the signals in the channels 3, 6 and 8 are positive.

The time-shift of the last signal pulse 9 with respect to its position as shown in Fig. 1*b* is equal to the algebraic sum of the time-shifts of the signal pulses associated with the busy channels.

The modulation space available for each channel will now be considered more fully.

For satisfactory operation of the multiplex device it is required that the time interval between the signal pulse 9 and the subsequent synchronisation pulse 1' in Fig. 1*b* be greater than the maximum value of the algebraic sum of the shifts of the signal pulses associated with the busy channels.

According to the theory of probability, this maximum value is equal to the maximum time-shift ($p$) of a signal pulse, multiplied by the root from the number of channels which are busy simultaneously ($\sqrt{n}$).

The table below shows for time multiplex-systems, as a function of a number of available channels N corresponding to the number of connected channels, one of which serves for the transmission of the synchronisation pulses, the number of channels ($n$) which are busy simultaneously according to the theory of probability:

| | | | | | | | |
|---|---|---|---|---|---|---|---|
| N | 5 | 9 | 17 | 25 | 37 | 49 | 101 |
| $n$ | 3 | 5 | 8 | 11 | 16 | 19 | 35 |

It then follows from Fig. 1*b* that the sum of the time intervals between the pulses transmitted during each cycle period is equal to $8p+p\sqrt{5}$, which sum must at the most be equal to one cycle period (99 microseconds) less the duration of the synchronisation pulse (11 microseconds) and that of the 8 signal pulses (4 microseconds).

From this equation is found 16.4 microseconds for the modulation space ($2p$) available for each channel, this value thus being over 50% higher than that for the above-described time-multiplex system with pulse phase modulation.

Figure 1D:
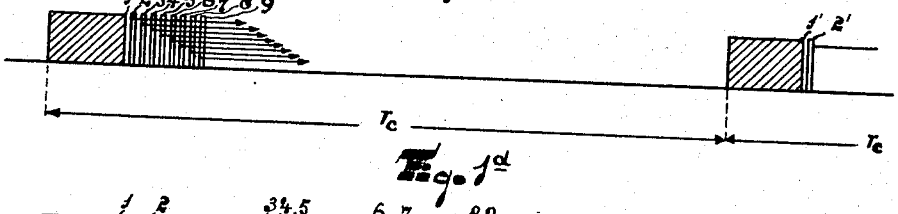

Fig. 1*d* shows the time diagram of the transmitted pulses for a time-multiplex system with pulse-interval modulation according to the invention in the absence of signals to be transmitted. Each synchronisation pulse 1, 1' is followed by the occurrence of a series of rapidly succeeding signal pulses of which the mutual time interval is a fraction, for example $\frac{1}{10}$, of the mean pulse interval in Figs. 1*b* and 1*c*.

According to the invention, when a transmission channel is made busy, the mean time-interval between the signal pulse associated with the transmission channel concerned and the preceding channel is increased.

Figure 1E:
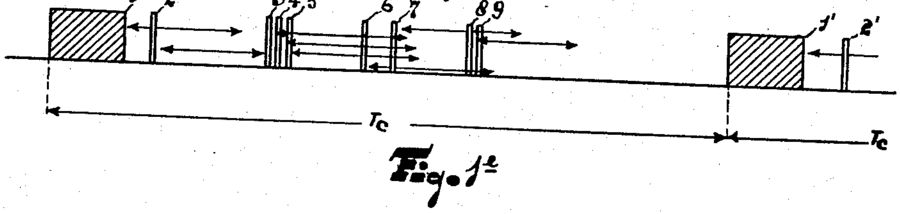

Fig. 1*e* shows the time diagram for the signal pulses in an operative position of the multiplex system according to the invention in which the channels 2, 3, 6, 7 and 8 are assumed as busy, as in the diagram of Fig. 1*c* for known time-multiplex systems with pulse-interval modulation.

In order to permit a comparison between the two systems, the modulation space available for each channel as indicated by arrows is chosen to be equal for both systems. Furthermore, the time intervals between the signal pulses 2, 3, 6, 7 and 8 associated with the busy channels and the preceding pulses are made equal to the corresponding intervals in the time diagram of Fig. 1*c*.

The time diagrams shown in Figs. 1*c* and 1*e* then differ solely in the time intervals between the signal pulses associated with the clear channels and the preceding channels.

The use of the step according to the invention brings about a considerable saving of time per transmission cycle so that the modulation space available for each transmission channel may be increased considerably.

Similarly as for the known time-multiplex system for pulse-interval modulation, it may now be deduced that a modulation space of 23.4 microseconds is available for each channel. Or, if an increase of the available modulation space is not desired, the number of channels with unvaried duration of cycle may substantially be double in Fig. 1*e* with respect to Fig. 1*c*, as will appear from the table following hereinafter.

This table shows in microseconds the modulation space available for each channel as a function of the available number of channels N for:

1. A time-multiplex system with pulse-phase modulation (P. P. M.)
2. A known time-multiplex system with pulse-interval modulation (P. D. M.)
3. A time-multiplex system according to the invention (P. D. M.)

One transmission cycle is 99 microseconds, the duration of each signal pulse is 0.5 microsecond, and the duration of a synchronisation pulse corresponds to a channel period of the time-multiplex system with pulse-phase modulation.

| N (number of channels) | 5 | 9 | 17 | 25 | 37 | 49 | 101 |
|---|---|---|---|---|---|---|---|
| Duration synchronisation pulse | 19.8 | 11 | 5.8 | 4 | 2.7 | 2 | 1 |
| P. P. M.-system | 19.3 | 10.5 | 5.3 | 3.5 | 2.2 | 1.5 | 0.5 |
| Known P. D. M.-system | 27.1 | 16.4 | 9.1 | 6.6 | 3.9 | 2.8 | 1 |
| P. D. M.-system according to the invention | 32.8 | 23.4 | 15.8 | 11.6 | 7.8 | 6.2 | 2.3 |

Fig. 2 shows a particularly advantageous embodiment of a multiplex transmitter according to the invention, which permits of transmitting carrier-wave signals modulated by pulses as shown in Figs. 1*d* and 1*e*.

The transmitting device shown comprises 9 transmitting channels 10–18, of which the transmitting channel 10 serves for the transmission of the synchronisation pulses and the other channels constitute, for example, speech channels. The synchronisation channel 10 and one of the relatively identical speech channels, viz. 12, are shown in a circuit diagram.

All the channels 10 to 18 include pulse generators 19 to 27, which excite one another during each cycle period for generating a number of pulses corresponding to the number of channels. The pulse generator 19 serves to generate the synchronisation pulses, the other pulse generators 20 to 27 being constructed as pulse modulators.

The series of pulse generators are made operative at the rate of the cycle frequency by a cycle synchronisation pulse derived from a pulse generator 29 and supplied through a conductor 28 to the first pulse generator 19. The pulse generator 29 is synchronised by a sinusoidal voltage of cycle frequency supplied by an oscillator 30.

The relatively identical pulse generators 20 to 27, which serve as pulse modulators, will now be explained more fully with reference to the pulse generator 21 indicated in detail diagram in the channel 12.

The pulse generator 21 comprises two pentodes 31, 31' which are incorporated in one tube and have separate anode resistances 32, 32', interconnected suppressor grids or screen grids, and a common cathode. The pentodes are coupled in a cross-wise manner by means of a condenser 33 and a resistance 33' and thus cut off one another.

This arrangement, which is known per se, has a stable working point and a metastable working point. The pentode 31 conveys maximum anode current while the pentode 31' is cut off in the first, the stable working point, which will be indicated hereinafter as "rest position." The conditions are reversed in the second, the metastable working point, termed the "operating position," pentode 31 then being cut off and pentode 31' conveying current. Passage from the first working point to the other takes place very rapidly as a result of the cross-wise coupling. The pentode 31 will, normally, convey current by applying by way of a resistance 34 a high positive biasing potential to the control grid of pentode 31. The voltage set up across resistance 33', which constitutes a voltage divider connected between the anode of pentode 31' and earth, is insufficient to release the pentode 31' which was cut off by a cathode resistance, preferably common to all the pulse generators.

The pulse generator 19 only differs from the pulse generators 20 to 27 serving as pulse modulators in regard to the value of the feedback condenser 35.

The speech channels 11 to 18 furthermore include low-frequency amplifiers 36 to 43 respectively, of which only the amplifier in the second speech channel 12 is shown in detail diagram. The speech to be transmitted is fed to a microphone 44 and supplied by way of a coupling condenser 45 and a grid resistance 46 to the control grid of a pentode 48 which is negatively back-coupled by a cathode resistance 47. The output resistance of the pentode 48 is constituted by the anode resistance 32' of the pentode 31', normally cut off, of the pulse generator 21, so that the anode voltage of tube 31' varies as a function of the speech to be transmitted.

Starting from the above-described rest position of the pulse generator 21 in which pentode 31 conveys current and pentode 31' is cut off, a negative pulse is supplied by way of a coupling lead 49 to the control grid of pentode 31 at the end of a pulse generated by the preceding pulse generator 20. The anode current of the pentode 31 thus decreases and the anode voltage increases, which results in the pentode 31' being cut off by way of the voltage divider 33'. The resulting anode current through the second pentode 31' brings about a decrease of potential of the anode of this pentode, said decrease in potential being transmitted by condenser 33 to the control grid of pentode 31 and assisting in the action of the negative voltage pulse supplied thereto. As is known per se, this cumulative action simultaneously causes the pentode 31 to be suddenly cut off and the pentode 31' to be released.

Upon passing to the operating position, the increase in potential of the anode of the first pentode 31 is transmitted by way of a coupling condenser 50 to the input control grid of the next pulse generator 22. The resulting voltage pulse at the input control grid of the pulse generator 22 has a positive polarity and does not affect the first pentode thereof, which is then current-conveying.

In the absence of the microphone amplifier 37, the pulse generator 21 automatically returns to its rest position after a period determined by the instantaneous charge of condenser 33 upon passage to the operating position and by the time-constant of the discharge circuit of condenser 33, which discharge circuit is substantially constituted by the resistances 32' and 34 since, if the charge of condenser 33 has decreased across its discharge circuit to such extent that the pentode 31' being suddenly cut off due to the direct-current coupling 33'.

In the presence of the microphone amplifier 37 and on speaking before the microphone 44, the instantaneous charge of condenser 33 varies as a function of the signal to be transmitted. According to the instantaneous polarity of the transmitted signal, the moment of return to rest position is earlier or later to an extent dependent upon the instantaneous value of the signal voltage. Positive voltage pulses then occur across the output resistance 32 of the pulse generator 21, the rear flank of said pulses varying as a function of the signal to be transmitted.

In this connection it is mentioned that the mean charge of condenser 33 and hence the mean duration of the general pulses is dependent upon the direct-voltage loss brought about across the resistance 32' by the anode current of the microphone amplifier 37, the mean duration of the pulses increasing upon decreasing direct-voltage loss. The mean time-constant of the pulse generator 21 is thus adjustable by adjustment of the working point of the pentode 48, which is connected as a microphone amplifier.

When the first pulse generator 21 returns to its rest position, a negative voltage pulse is supplied by way of a coupling condenser 50 to the input control grid of the pulse generator 22, which serves as a pulse modulator and which, as described in detail for the pulse generator 21, brings the pulse generator 22 out of its rest position and provides a pulse modulated in duration, etc.

The signal pulses produced across the output circuit of the pulse generator 21 are supplied to a differential network comprising a series condenser 51 and a parallel resistance 52. At the beginning and at the end of each signal pulse, voltage pulses of positive and negative polarity respectively occur across resistance 52 of the differential network, said pulses after being limited by a rectifier cell 53 being supplied to the control grid of a pentode 54 which is connected as a voltage multiplier. Pulses of constant duration and positive polarity occur across the output resistance 55 of the voltage amplifier, which pulses coincide with the rear flanks of the pulses derived from the pulse generator 21.

The output circuits of the pulse generators 20 to 27 are coupled in an analogous manner to voltage amplifiers 56 to 63, the output resistances of which are connected to a common line 65; the pulses derived from the output circuits of the voltage amplifiers 56 to 63 occur in succession since the pulse modulators 20 to 27 excite one another in succession. The synchronisation channel does not include a voltage amplifier but is connected by way of a coupling condenser 64 direct to the line 65.

The variations in time-interval between signal pulses associated with succeeding channels thus characterise only the signal to be transmitted in the latter channel, the mean interval between these pulses being determined by the mean time-constant of the pulse generator included in the last-mentioned channel.

The amplified voltage pulses produced in the line 65 are supplied, if desired after further amplification and limitation, to a modulator 66 for amplitude—or frequency modulation of a carrier wave generated by an oscillator 67. The modulated carrier wave is supplied to a transmitting aerial 68 and radiated.

In the example shown, one cross-wire coupling of the pulse generators 19 to 27 is capacitive and the other is galvanic or direct-current, which is not strictly necessary since inductive coupling instead of the capacitive coupling may be used. Furthermore, the pulse generators may be of a different construction, for example in the form of a transitron circuit having a single pentode, the screen grid of which is capacitively connected to the suppressor grid.

The mean time-constants of the pulse generators included in the various channels have minimum values when the channels are clear, as may be seen from Figs. 1*d* and 1*e* for the channels 4, 5 and 9.

According to the invention, the pulse generators 20 to 27 comprise means for increasing, when one channel is made busy, the mean time-constant of the pulse generator included in the channel involved.

The means for increasing, when one channel is made busy, the mean time-constant of the pulse generator included in this channel preferably comprise a relay device which is connected to the pulse generator included in this channel.

For this purpose, in the embodiment shown, the control-grid circuit of the pentode 48, connected as a microphone amplifier, includes a relay device 69 having a back-contact 70 by which a part of the cathode resistance 47 is shunted. When the relay 69 responds, the cathode resistance increases, resulting in a decrease of the direct-voltage across the output resistance 32′ of the microphone amplifier which, as has been explained before, brings about an increase of the mean time-constant of the pulse generator 21. The decrease of the direct-voltage loss across resistance 32′ may be regarded as the supply of a modulation voltage constituted by a direct voltage to the pulse modulator 21.

To control the relay 69, 70, the input circuit of the relay device is connected to a microphone lead 71, which is connected to the signalling means included in this channel. The signalling means are constituted by a direct-voltage source 72, which is connected by way of a resistance 73 to the microphone lead 71, and a switch 74 included in the microphone lead. When the transmitting channel 12 is made busy, switch 74 is closed and a direct signalling voltage occurs across the microphone lead 71 and causes the relay 69, 70 to respond.

In order to separate the signalling voltage and the microphone signals, the input circuit of the relay device comprises a low-pass filter constituted by the series combination of a choke coil 75 and a condenser 76, the latter being shunted by the relay 69. A decoupling condenser 45 prevents the signalling voltage from occurring at the control grid of the microphone amplifier.

As an alternative, the mean time-constant of the pulse generator 21 may be increased by the signalling voltage itself. For this purpose use is made of a direct signalling voltage source of negative polarity which is connected for direct-current by way of a resistance and a switch to the grid of the microphone amplifier 37. When the switch is closed, the negative signalling voltage becomes operative in the control-grid circuit, resulting in a decrease of the direct anode current of the pentode 48, as in the embodiment discussed in detail hereinbefore.

In addition to obtaining an increase of the mean time-constant of the pulse generators connected as pulse modulators by means of shift of the working points of the microphone amplifiers connected to them, an increase of the mean time-constant may be obtained by an increase in time-constant of the feedback circuit of the pulse generators concerned. This is brought about, for example, by connecting an additional condenser parallel to the feedback condenser 33 and/or connecting an additional resistance in series with the resistance 34 by means of a switch which is actuated when the relay responds.

For actuating the relay device, use may alternatively be made of alternating-voltage signalling, a separating filter ensuring that, on the one hand, the signalling voltage cannot penetrate to the control grid of the microphone amplifiers and, on the other hand, the speech signals cannot enter the relay device.

Finally, it is mentioned that the signalling voltage may also be supplied to the relay involved by way of a separate signalling channel.

Fig. 3 shows a multiplex receiving device according to the invention, comprising eight receiving channels 77 to 84 adapted for the reception of signals transmitted by the transmitting device shown in Fig. 2.

The pulses received by an aerial 85 are supplied, after high-frequency amplification and detection by device 86, through a lead 87 with negative polarity in parallel connection to pulse demodulators included in the receiving channels 77 to 84 and connected to signal amplifiers 111 to 118. The pulse modulators are constituted by relatively identical pulse generators exciting one another in succession, the first of which is shown in a schematic circuit diagram. The pulse generators 88 to 95 only differ from the pulse generators serving as pulse modulators in Fig. 2 in regard to the values of the mean time-constants, which in the case under consideration are required to be greater than the modulation space available for each channel.

The operation will now be explained in detail by reference to pulse demodulator 88.

It is assumed that in the rest position the first pentodes of the pulse demodulators 88 to 95 are current-conveying. In each transmission cycle the series of pulse generators 88 to 95 are made operative by a cycle-synchronisation pulse of negative polarity supplied through a lead 96 to the control grid of the first pentode 97, which results in pentode 97 being cut off and pentode 97′ being released.

The cycle-synchronisation pulse is derived from a separating device 98, which is connected to the device 86 and which comprises, for example, an integrating network and a threshold device connected in series therewith. In the circuit shown, automatic return to the rest position would occur after a period determined by the mean time-constant of the pulse generator 88. However a return to rest position is brought about before by a signal pulse of negative polarity associated with the channel concerned and supplied through the lead 87 and a resistance 99 to the control grid of the second pentode.

When the first pulse generator 88 returns to its rest position, the second pulse generator 89 is operated by a voltage pulse of negative polarity, supplied by way of a coupling condenser 100, to return subsequently to its rest position by means of a signal pulse associated with this channel.

In this connection it is mentioned that the pulse generators 88 to 95 are restored to their rest position by the front flanks of the signal pulses. However, it is alternatively possible to bring about this return by means of the rear flanks of the signal pulses.

Time-modulated pulses of positive polarity thus occur in the output circuits of the succeeding pulse generators 88 to 95, the variations in time characterising the signals transmitted in the channels concerned.

The time-modulated pulses occurring across the output circuit of the pulse demodulator 88 are supplied by way of a condenser 101 to a signal amplifier 102 and a reproducing device 103, either direct or through a low-pass filter suppressing the pulse-repetition frequency.

In the embodiment shown, the cross-wise couplings of the pulse generators are of a different nature, which is not required. For example, both couplings may be direct-current, capacitive or inductive. If desired, the two couplings may be a combination of different possibilities of realisation. Furthermore, use may be made of a different type of pulse generator, for example a transitron circuit.

According to the invention, the output of the pulses demodulator 88 is connected to a signalling-voltage generator which responds to an increase of the mean time-interval between pulses associated with the channel concerned and the preceding channel.

The signalling-voltage generator comprises a maximum relay 104 having a make contact 105 and an alarm signal installation connected thereto and comprising the series combination of a battery 106 and a pilot lamp 107, which series combination is shunted by the make contact 105.

The relay 104 is connected by way of a resistance 108 parallel to a parallel condenser 109 of a low-pass filter suppressing the signal voltages and having a choke coil 110, which is connected for direct-current to the output of the pulse demodulator 88.

When the transmission channel 77 is made busy, the interval between the signal pulse associated with the channel concerned and the preceding pulse (here the synchronisation pulse) is increased, resulting in an increase of the mean duration of the pulses of positive polarity appearing at the output of the pulse demodulator 88 and an increase of the voltage across condenser 109, so that the maximum relay 104, 105 responds.

The signalling-voltage generator may alternatively be connected to the pulse demodulator in a capacitive manner, which is effected by connecting the output of the pulse demodulator 88 by way of a coupling condenser and a rectifier to a low-pass filter 109, 110. In this case also the voltage across the parallel condenser 109 increases when a transmission channel is made busy.

What I claim is:

1. Apparatus for transmitting by pulse modulation a plurality of signals through a series of transmission channels operating in time multiplex, comprising means for producing a cyclical train of pulses corresponding in number to the number of said channels, means for varying the time interval between pulses associated with succeeding channels in said series in accordance with the signal to be transmitted in the latter of these channels, and means for increasing, when a transmission channel is made busy, the mean time interval between the signal pulse associated with the busy channel and the pulse associated with the preceding channel.

2. Apparatus for transmitting by pulse modulation a plurality of signals through a series of transmission channels operating in time multiplex comprising a pulse modulator in each of said channels for producing signal pulses, means to excite the pulse modulators in succession after a period depending on the signal to be transmitted whereby the variation in time interval between signal pulses associated with succeeding channels in said series characterises the signal to be transmitted in the latter of these channels, the mean time constant of the latter of succeeding modulators determining the mean time interval between the corresponding successive pulses, and means responsive upon a channel being rendered busy to increase the mean time constant of the modulator included therein.

3. Apparatus for transmitting by pulse modulation a plurality of signals through a series of transmission channels operating in time multiplex comprising a pulse modulator in each of said channels for producing signal pulses, means to excite the pulse modulators in succession after a period depending on the signal to be transmitted whereby the variation in time interval between signal pulses associated with succeeding channels in said series characterises the signal to be transmitted in the latter of these channels, the mean time constant of the latter of succeeding modulators determining the mean time interval between the corresponding successive pulses, and means responsive upon a channel being rendered busy to increase the mean time constant of the modulator included therein, said last-named means including a relay for actuation when the channel is rendered busy.

4. Apparatus as set forth in claim 3 further including means to produce upon actuation of said relay a direct-voltage, and means to supply said direct voltage as a modulating voltage to said pulse modulator in the busy channel.

5. Apparatus for transmitting by pulse modulation a plurality of signals through a series of transmission channels operating in time multiplex comprising a pulse modulator in each of said channels for producing signal pulses and provided with a feedback circuit including a switch, means to excite the pulse modulators in succession after a period depending on the signal to be transmitted whereby the variation in time interval between signal pulses associated with succeeding channels in said series characterises the signal to be transmitted in the latter of these channels, the mean time-constant of the latter of succeeding modulators determining the mean time interval between the corresponding successive pulses, and means responsive upon a channel being rendered busy to increase the mean time-constant of the modulator included therein, said last-named means including a relay for actuation when the channel is rendered busy, said relay closing the switch in the feedback circuit.

6. Transmitting apparatus as set forth in claim 5 wherein the input of said relay is connected to the signal input of the associated channel.

7. Transmitting apparatus as set forth in claim 6 wherein the input of said relay includes a filter for separating the signals to be transmitted and the signalling voltage.

8. Transmitting apparatus as set forth in claim 7 wherein said filter is constituted by a low-pass filter.

9. Apparatus for receiving signals to be transmitted by pulse modulation through receiving channels operating in time multiplex comprising a pulse demodulator in each of said channels for converting the variations in time interval between signal pulses conveyed in the channel involved and those in the preceding channel, and signalling voltage generators coupled to the respective pulse demodulators in said channels and responsive to an increase in the mean time interval between signal pulses associated with the channel involved and the preceding channel.

10. Receiving apparatus as set forth in claim 9 wherein the pulse demodulators are each connected through a low-pass filter to the signalling voltage generator included in the channel involved.

11. Receiving apparatus as set forth in claim 10 wherein said signalling voltage generator is constituted by a maximum relay and an alarm signal installation connected therewith.

(References on following page)

References Cited in the file of this patent

UNITED STATES PATENTS

| | | |
|---|---|---|
| 2,497,411 | Krumhansl | Feb. 14, 1950 |
| 2,549,422 | Carbrey | Apr. 17, 1951 |
| 2,559,606 | Dubin | July 10, 1951 |
| 2,559,644 | Landon | July 10, 1951 |
| 2,570,010 | Staal | Oct. 2, 1951 |
| 2,631,194 | Reeves | Mar. 10, 1953 |

FOREIGN PATENTS

| | | |
|---|---|---|
| 610,774 | Great Britain | Oct. 20, 1948 |